United States Patent
Fujioka et al.

(10) Patent No.: US 11,993,687 B2
(45) Date of Patent: May 28, 2024

(54) METHOD FOR MANUFACTURING MOLDED ARTICLE AND PREFORM OF MOLDED ARTICLE

(71) Applicant: Toray Industries, Inc., Tokyo (JP)

(72) Inventors: Takashi Fujioka, Ehime (JP); Kotaro Shinohara, Ehime (JP); Masato Honma, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 863 days.

(21) Appl. No.: 16/980,634

(22) PCT Filed: Mar. 28, 2019

(86) PCT No.: PCT/JP2019/013625
§ 371 (c)(1),
(2) Date: Sep. 14, 2020

(87) PCT Pub. No.: WO2019/189587
PCT Pub. Date: Oct. 3, 2019

(65) Prior Publication Data
US 2021/0009783 A1  Jan. 14, 2021

(30) Foreign Application Priority Data
Mar. 30, 2018  (JP) .................. 2018-070010

(51) Int. Cl.
*B29C 44/06* (2006.01)
*C08J 5/04* (2006.01)
(Continued)

(52) U.S. Cl.
CPC .............. *C08J 5/042* (2013.01); *B29C 44/06* (2013.01); *C08J 7/043* (2020.01); *C08J 7/056* (2020.01);
(Continued)

(58) Field of Classification Search
None
See application file for complete search history.

(56) References Cited

U.S. PATENT DOCUMENTS

| 4,113,487 A | 9/1978 | Matsunaga et al. |
| 4,798,763 A | 1/1989 | Kia |

(Continued)

FOREIGN PATENT DOCUMENTS

| CN | 105229833 A | 1/2016 |
| CN | 105492200 A | 4/2016 |

(Continued)

OTHER PUBLICATIONS

Japanese Notice of Reasons for Refusal for Japanese Application No. 2019-519014, dated Jul. 4, 2023 with translation, 7 pages.

(Continued)

*Primary Examiner* — Mohammad M Ameen
(74) *Attorney, Agent, or Firm* — BUCHANAN INGERSOLL & ROONEY PC

(57) ABSTRACT

Provided is a method for producing a molded article having a thin film layer (B) formed on a surface of a porous body (A). The method includes a process (I) and a process (II) described below in this order:

process (I): forming the thin film layer (B) on a surface of a precursor (a) of the porous body (A) to obtain a preform, and process (II): expanding and molding the precursor (a) to the porous body (A).

13 Claims, 2 Drawing Sheets

(51) Int. Cl.
  *C08J 7/043* (2020.01)
  *C08J 7/056* (2020.01)
  *C08J 9/36* (2006.01)

(52) U.S. Cl.
  CPC ........... *C08J 9/365* (2013.01); *C08J 2323/12* (2013.01); *C08J 2423/12* (2013.01)

(56) References Cited

U.S. PATENT DOCUMENTS

| | | |
|---|---|---|
| 9,962,904 B2 | 5/2018 | Hatanaka et al. |
| 2016/0087283 A1 | 3/2016 | Sumioka |
| 2016/0214346 A1* | 7/2016 | Hatanaka ............ B29C 45/1642 |
| 2017/0239895 A1 | 8/2017 | Takehara et al. |
| 2018/0015688 A1* | 1/2018 | Park ................... B32B 25/045 |
| 2019/0002654 A1 | 1/2019 | Shinohara et al. |
| 2019/0299495 A1 | 10/2019 | Fujioka et al. |

FOREIGN PATENT DOCUMENTS

| | | |
|---|---|---|
| EP | 3578353 A1 | 12/2019 |
| JP | 52115875 A | 9/1977 |
| JP | 57165897 A | 9/1982 |
| JP | 59226103 A | 12/1984 |
| JP | 04232047 A | 8/1992 |
| JP | 06320541 A | 11/1994 |
| JP | 08014395 A | 1/1996 |
| JP | 2009051124 A | 3/2009 |
| JP | 2010235779 A | 10/2010 |
| JP | 2013092551 A | 5/2013 |
| JP | 2013244470 A | 12/2013 |
| JP | 2015039842 A | 3/2015 |
| JP | 2015101670 A | 6/2015 |
| JP | 2016078450 A | 10/2015 |
| JP | 2015229149 A | 12/2015 |
| JP | 2016049649 A | 4/2016 |
| JP | 2016078451 A | 5/2016 |
| JP | 6123965 B1 | 5/2017 |
| JP | 2017114107 A | 6/2017 |
| JP | 2017120410 A | 7/2017 |
| TW | 201726360 A | 8/2017 |
| WO | 2014078496 A2 | 5/2014 |
| WO | 2015029634 A1 | 3/2015 |
| WO | 2017110533 A1 | 6/2017 |
| WO | 2017205600 A1 | 11/2017 |
| WO | WO-2017 205600 A1 * | 11/2017 |

OTHER PUBLICATIONS

Chinese Office Action for Chinese Application No. 201980022259. 7, dated Jan. 7, 2022, with translation, 16 pages.
International Search Report and Written Opinion for International Application No. PCT/JP2019/013625, dated Jun. 25, 2019, 6 pages.
Taiwanese Office Action with Search Report for Taiwanese Application No. 108111146, dated Oct. 6, 2022 with translation, 19 pages.
Extended European Search Report for European Application No. 19775868.3, dated Nov. 29, 2021, 10 pages.
Japanese Notice of Reasons for Refusal for Japanese Application No. 2019-519014, dated Oct. 17, 2023 with translation, 10 pages.

* cited by examiner (a)  (b)

METHOD FOR MANUFACTURING MOLDED ARTICLE AND PREFORM OF MOLDED ARTICLE

CROSS REFERENCE TO RELATED APPLICATIONS

This is the U.S. National Phase application of PCT/JP2019/013625, filed Mar. 28, 2019, which claims priority to Japanese Patent Application No. 2018-070010, filed Mar. 30, 2018, the disclosures of these applications being incorporated herein by reference in their entireties for all purposes.

FIELD OF THE INVENTION

The present invention relates to a method for manufacturing a molded article excellent in designability or waterproof property, and a preform of a molded article.

BACKGROUND OF THE INVENTION

In recent years, a fiber-reinforced composite material having a reinforcing fiber that is combined with a matrix resin is widely used in industrial products such as an automobile, an aircraft, and a sport good as a structural body having enhanced mechanical characteristics and lightweightness. Products using a fiber-reinforced composite material are coated with paint or the like in order to provide designability and waterproof property. A proposed technology to form a coating layer on a fiber-reinforced composite material involves heating a preform, obtained by laminating a prepreg layer with a resin layer formed of a thermosetting resin and a solid additive, so as to cure a matrix resin and the thermosetting resin in the resin layer thereby making a cured resin layer having an intended thickness (see, for example, Patent Literature 1).

On the other hand, with an aim to further reduce the weight of the fiber-reinforced composite material, a structural body having intended mechanical characteristics and formed of a resin, a reinforcing fiber, and a void has been proposed (see, for example, Patent Literature 2). To provide designability and so forth, when a coating layer was formed on the structural body having these voids continuously formed in a thickness direction, a material that constitutes the coating layer penetrated into the structural body so that there has been a problem in that the intended coating layer could not be obtained.

PATENT LITERATURE

Patent Literature 1: Japanese Laid-open Patent Publication No. 2016-78451
Patent Literature 2: Japanese Patent No. 6123965
Patent Literature 3: International Publication No. 2015/029634
Patent Literature 4: Japanese Laid-open Patent Publication No. S52-115875

SUMMARY OF THE INVENTION

A technology has also been proposed to form a picture design by means of a skin material and an ink on a surface of a porous body (see, for example, Patent Literatures 3 and 4). However, the skin layer in Patent Literature 3 is formed to enhance rigidity of a core layer having voids; and thus, in view of designability, an additional coating layer is needed to be formed. Besides, because a prepreg having a matrix resin impregnated into reinforcing fibers is used as the skin layer, a time to prepare the prepreg layer is necessary. In addition, the core layer and the skin layer are not bonded in a process prior to a molding process of the porous body, so that at the time of molding, the core layer and the skin layer need to be laminated to an intended structure. On the other hand, in Patent Literature 4, because the porous body is formed by using a blowing agent, the voids are discontinuous so that this does not have a problem of the material penetration.

Present invention was made in the light of the circumstances as described above; and thus, the present invention intends to provide: a method for producing a molded article that is excellent in rigidity and lightweightness, and has enhanced designability or waterproof property, and can be molded by a convenient process; and a preform of a molded article.

A method for producing a molded article according to the present invention is a method for producing a molded article having a thin film layer (B) formed on a surface of a porous body (A). The method includes a process (I) and a process (II) described below in this order:

process (I): forming the thin film layer (B) on a surface of a precursor (a) of the porous body (A) to obtain a preform, and process (II): expanding and molding the precursor (a) to the porous body (A).

The present invention is a preform of a molded article having a thin film layer (B) formed on a surface of a porous body (A) that includes a reinforcing fiber (A1), a resin (A2), and a void (A3). The preform includes: a precursor (a) of the porous body (A); and the thin film layer (B) formed on a surface of the precursor (a). An adhesion property of the thin film layer (B) to the precursor (a) belongs to classes 0 to 3 in accordance with JIS K5600-5-6 (1999).

According to the production method of a molded article and the preform of the molded article in the present invention, because a thin film layer is formed in the state of a precursor (a) of a porous body (A), the thin film layer (B) does not penetrate into a continuous pore of the porous body (A); and thus, a molded article having excellent designability and waterproof property with maintaining lightweightness thereof can be obtained. In addition, because there is no need to consider the penetration, many options are available in selection of the material to form the thin film layer (B), so that the degree of a design freedom is high. In addition, even in the case that the process (II), i.e., the molding process, is carried out in the place different from the process (I), there is no need, among others, to laminate the precursor (a) of the porous body (A) with the thin film layer (B), so that the molded article can be produced conveniently.

DETAILED DESCRIPTION OF EMBODIMENTS OF THE INVENTION

Figure 1:
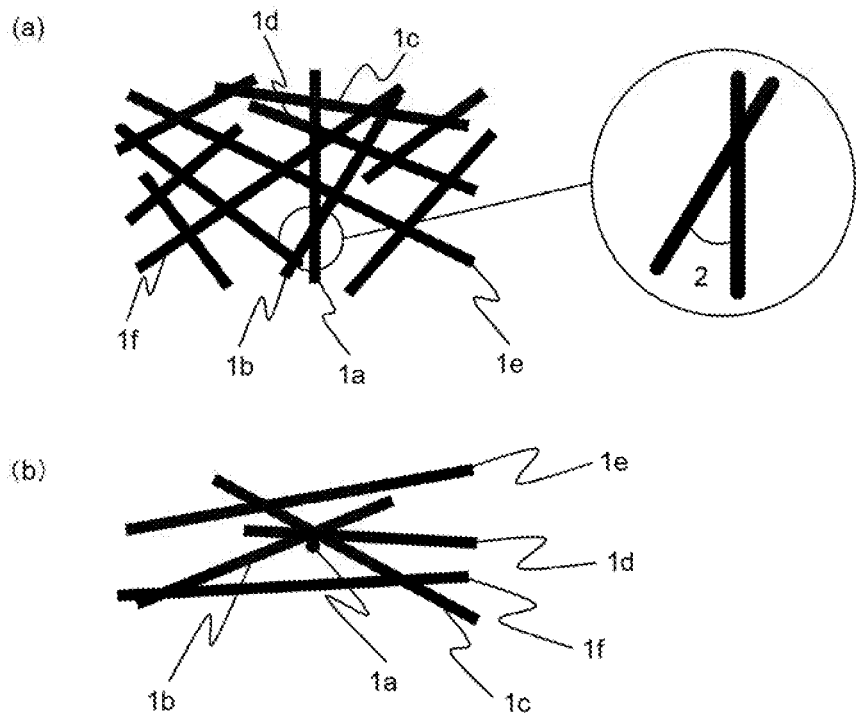
FIG. 1 is a schematic drawing depicting one example of a dispersion state of the reinforcing fibers in the reinforcing fiber mat according to the present invention.

Hereinafter, the method for producing a molded article according to the present invention will be described.

The method for producing a molded article according to the present invention is the method for producing a molded article having a thin film layer (B) formed on a surface of a porous body (A), in which a process (I) and a process (II) described below are carried out in this order: process (I): the thin film layer (B) is formed on a surface of a precursor (a) of the porous body (A) to obtain a preform, and process (II): the precursor (a) is expanded and molded to the porous body (A).

Porous Body (A)

In the molded article of the present invention, the porous body (A) has a reinforcing fiber (A1), a resin (A2), and a void (A3).

In the porous body (A) of the present invention, illustrative examples of the reinforcing fiber (A1) include: metal fibers such as aluminum, yellow copper, and stainless steel; carbon fibers such as a PAN type, a rayon type, a lignin type, and a pitch type; graphite fibers; insulating fibers such as a glass; organic fibers such as aramid, PBO, polyphenylene sulfide, polyester, acrylic, nylon, and polyethylene; and inorganic fibers such as silicon carbide and silicon nitride. In addition, these fibers whose surfaces have been surface-treated may be used as well. Illustrative examples of the surface treatment include, in addition to an attachment treatment with a metal as a conductive body, a treatment with a coupling agent, a treatment with a sizing agent, a treatment with a binding agent, and an attachment treatment with an additive. These fibers may be used singly, or two or more of them may be used concurrently. Of these, in view of a weight-reduction effect, carbon fibers such as a PAN type, a pitch type, and a rayon type, these being excellent in a specific strength and a specific rigidity, are preferably used. In view of enhancement in an economy of the porous body (A) to be obtained, a glass fiber is preferably used; and especially in view of a balance between an economy and mechanical characteristics, a concurrent use of a carbon fiber and a glass fiber is preferable. In view of enhancement in a shock-absorbing property and a shape-formability of the porous body (A) to be obtained, an aramid fiber is preferably used; and especially in view of a balance between mechanical characteristics and a shock-absorbing property, a concurrent use of a carbon fiber and an aramid fiber is preferable. In view of enhancement in conductivity of the porous body (A) to be obtained, a metal fiber formed of a conductive metal, as well as a reinforcing fiber covered with a metal such as nickel, copper, or ytterbium may also be used. Of these, a reinforcing fiber selected from the group consisting of a metal fiber, a pitch type carbon fiber, and a PAN type carbon fiber may be preferably used; these fibers being excellent in mechanical characteristics such as strength and an elastic modulus.

It is preferable that the reinforcing fiber (A1) be discontinuous and dispersed randomly in the porous body (A). It is more preferable that the dispersion thereof be in the substantially monofilament-like state. The reinforcing fiber (A1) according to the embodiment can be readily shaped into a complex shape upon molding the precursor (a) of the porous body (A) or the porous body (A) in the sheet-like form, by means of an outer force. In addition, the reinforcing fiber (A1) according to the embodiment can densify the voids (A3) formed by the reinforcing fibers (A1), so that a weak portion in the tip of the fiber bunch of the reinforcing fibers (A1) in the porous body (A) can be minimized; and thus, in addition to excellent reinforcing efficiency and reliability, an isotropy can be provided.

Here, the substantially monofilament-like state means that the reinforcing fiber single thread exists as a strand of less than 500 fine fiber threads. More preferably, they are dispersed in a monofilament-like state, namely in the state of a single thread.

Here, the dispersion in the substantially monofilament-like state or in the monofilament-like state means that the ratio of the single fibers having the two-dimensional orientation angle of 1° or more (hereinafter, this is also called a fiber dispersion rate) is 80% or more in the reinforcing fibers (A1) that are randomly selected in the porous body (A); in other words, this means that the bunch in which 2 or more single fibers contact in parallel is less than 20% in the porous body (A). Accordingly, it is especially preferable here that a mass fraction of the fiber bunch including 100 or less filaments at least in the reinforcing fibers (A1) be 100%.

It is especially preferable that the reinforcing fibers (A1) be dispersed randomly. Here, the random dispersion of the reinforcing fibers (A1) means that an arithmetic average value of the two-dimensional orientation angle of the reinforcing fibers (A1) that are randomly selected in the porous body (A) is in the range of 30° or more and 60° or less. The two-dimensional orientation angle is an angle formed between a single fiber of the reinforcing fibers (A1) and a single fiber intersecting with the before-mentioned single fiber; and this is defined as the angle in the acute angle side in the range of 0° or more and 90° or less among the angles formed by the intersecting single fibers with each other.

This two-dimensional orientation angle will be further elaborated by referring to the drawings. In FIG. 1(a) and FIG. 1(b), taking the single fiber 1a as a standard, the single fiber 1a intersects with other single fibers 1b to 1f. Here, the term "intersect" means the state in which the standard single fiber is observed to intersect with other single fiber in the observed two-dimensional plane; and thus, the single fiber 1a is not necessarily contact with other single fibers 1b to 1f, so that this does not extrude the state in which these fibers are observed to intersect with each other upon projection. Namely, with regard to the single fiber 1a as the standard, all of the single fibers 1b to 1f are the objects for evaluation, in which in FIG. 1(a), the two-dimensional orientation angle is the angle in the acute angle side in the range of 0° or more and 90° or less among the two angles formed by the intersecting two single fibers.

There is no particular restriction as to the measurement method of the two-dimensional orientation angle. One example thereof is to observe the orientation of the reinforcing fiber (A1) from the surface of the constitution element. The average value of the two-dimensional orientation angles is measured with the following procedure. Namely, the average value of the two-dimensional orientation angles of a single fiber randomly selected (single fiber 1a in FIG. 1) with all the single fibers that intersect therewith (single fibers 1b to 1f in FIG. 1) is measured. For example, in the case that a certain single fiber intersects with many other single fibers, 20 of the other single fibers intersecting therewith are randomly selected; and an arithmetic average value of these measured values may be used as a substitute. This measurement is repeated five times in total using other single fiber as the standard; and the arithmetic average value thereof is calculated as the arithmetic average value of the two-dimensional orientation angles.

When the reinforcing fibers (A1) are dispersed randomly and in the substantially monofilament-like state, the performance provided by the reinforcing fibers (A1) dispersed in the substantially monofilament-like state described above can be maximized. In addition, an isotropy can be given to the mechanical characteristics in the porous body (A). From these viewpoints, the fiber dispersion rate of the reinforcing fibers (A1) is preferably 90% or more, while it is more preferable when this rate approaches to 100% as close as possible. The arithmetic average value of the two-dimensional orientation angles of the reinforcing fibers (A1) is preferably in the range of 40° or more and 50° or less, while it is more preferable when it approaches to the ideal angle of 45° as close as possible. In the preferable range of the two-dimensional orientation angle, the upper limit thereof may be any of the above-mentioned upper limit value, and the lower limit thereof may be any of the above-mentioned lower limit value.

On the other hand, illustrative examples of the reinforcing fibers (A1) not in the non-discontinuous form include a sheet substrate, a woven substrate, and a non-crimp substrate, in which the reinforcing fibers (A1) are orientated in one direction. In these forms, the reinforcing fibers (A1) are disposed regularly and densely, resulting in a decrease in the voids (A3) in the porous body (A); and thus, impregnation of the resin (A2) thereto is very difficult, thereby occasionally causing formation of a non-impregnated portion as well as significant restriction in choice of the impregnation method and of the resin type.

The reinforcing fiber (A1) may be any in the form of a continuous reinforcing fiber having substantially the same length as the porous body (A), or in the form of a discontinuous reinforcing fiber having been cut to a prescribed, limited length. In view of easy impregnation of the resin (A2) and easy adjustment of the amount thereof, the discontinuous reinforcing fiber is preferable.

The mass-average fiber length of the reinforcing fibers (A1) is preferably in the range of 1 mm or more and 15 mm or less. In such a case, the reinforcing efficiency of the reinforcing fiber (A1) can be enhanced so that the porous body (A) can be provided with excellent mechanical characteristics. When the mass-average fiber length of the reinforcing fibers (A1) is 1 mm or more, the void (A3) in the porous body (A) can be formed so efficiently that the density can be lowered. In other words, the porous body (A) with a reduced weight can be obtained even if the thickness thereof is the same; and thus, this is preferable. On the other hand, when the weight-average fiber length of the reinforcing fibers (A1) is 15 mm or less, the reinforcing fiber (A1) in the porous body (A) is difficult to be bent by its own weight so that expression of the mechanical characteristics is not impaired; and thus, this is preferable. The mass-average fiber length can be calculated as follows. Namely, after the resin (A2) in the porous body (A) is removed with a method such as burning and elution, 400 fibers are randomly selected from the remaining reinforcing fibers (A1); and then, the lengths thereof are measured to the unit of 10 μm. From these values, the mass-average fiber length can be calculated.

In view of easy impregnation of the resin (A2) into the reinforcing fibers (A1), the reinforcing fiber (A1) is preferably in the form of a nonwoven fabric. The reinforcing fiber (A1) in the form of a nonwoven fabric is preferable also because of not only easy handling of the nonwoven fabric itself but also easy impregnation even in the case of a thermoplastic resin, which is generally considered to be highly viscous. Here, the form of the nonwoven fabric means the form in which strands and/or monofilaments of the reinforcing fibers (A1) are irregularly dispersed in plane directions. Illustrative examples thereof include a chopped strand mat, a continuance strand mat, a paper-made mat, a carding mat, and an air-laid mat (hereinafter, these are collectively called a reinforcing fiber mat).

In the porous body (A) of the present invention, illustrative examples of the resin (A2) include a thermoplastic resin and a thermosetting resin. In the present invention, the thermoplastic resin and the thermosetting resin may be blended as well. The resin (A2) becomes a matrix resin constituting the porous body (A) and the precursor (a) of the porous body (A).

In an embodiment of the present invention, it is preferable that the resin (A2) include at least one or more thermoplastic resins. Illustrative examples of the thermoplastic resin include: crystalline resins [for example, polyesters such as polyethylene terephthalate (PET), polybutylene terephthalate (PBT), polytrimethylene terephthalate (PTT), polyethylene naphthalate (PEN), and liquid crystal polyester; polyolefins such as polyethylene (PE), polypropylene (PP), and polybutylene; polyoxymethylene (POM); polyamide (PA); polyarylene sulfides such as polyphenylene sulfide (PPS); polyketone (PK); polyether ketone (PEK); polyether ether ketone (PEEK); polyether ketone ketone (PEKK); polyether nitrile (PEN); fluorine-containing resins such as polytetrafluoroethylene; and liquid crystal polymers (LCP)]; amorphous resins [for example, in addition to styrenic resins, polycarbonate (PC), polymethyl methacrylate (PMMA), polyvinyl chloride (PVC), polyphenylene ether (PPE), polyimide (PI), polyamide imide (PAI), polyether imide (PEI), polysulfone (PSU), polyether sulfone, and polyarylate (PAR)]; and other resins such as a phenol type, a phenoxy, a polystyrene type, a polyolefin type, a polyurethane type, a polyester type, a polyamide type, a polybutadiene type, a polyisoprene type, and fluorine type resins; and thermoplastic elastomers such as an acrylonitrile type resin, as well as thermoplastic resins selected from copolymers of these resins and modified resins thereof. Of these, in view of lightweightness of the porous body (A) to be obtained, polyolefins are preferable; in view of strength, polyamides are preferable; in view of surface appearance, amorphous resins such as polycarbonate and styrenic resins are preferable; in view of heat resistance, polyarylene sulfides are preferable; in view of continuous use temperature, polyether ether ketones are preferable; and in view of chemicals resistance, fluorine type resins are preferably used.

In an embodiment of the present invention, it is preferable that the resin (A2) include at least one or more thermosetting resins. Illustrative examples of the thermosetting resin include unsaturated polyesters, vinyl esters, epoxy resins, phenol resins, urea resins, melamine resins, thermosetting polyimides, copolymers of these resins, modified resins of them, as well as a blend of at least two or more of them.

The porous body (A) of the present invention may contain, as one ingredient of the resin (A2), a shock resistance enhancer such as an elastomer or a rubber ingredient, as well as other filling material and additives so far as they do not impair the object of the present invention. Illustrative examples of the filling material and the additive include an inorganic filling material, a flame retardant, a conductivity affording agent, a nucleating agent, a UV absorber, an antioxidant, a vibration damping material, an antibacterial agent, an insecticide, a deodorant, an anti-coloring agent, a heat stabilizer, a releasing agent, an antistatic agent, a plasticizer, a lubricant, a coloring material, a pigment, a dye, a blowing agent, an antifoaming agent, and a coupling agent.

The porous body (A) of the present invention has the void (A3). The void (A3) in the present invention means a space formed by overlapping or crossing of pillar-like supporting bodies, which are formed of the reinforcing fibers (A1) covered with the resin (A2). For example, in the case that the porous body (A) is obtained by heating the precursor (a) of the porous body (A) prepared by impregnating the reinforcing fibers (A1) with the resin (A2) in advance, the reinforcing fiber (A1) is raised up by melting or softening of the resin (A2) due to heating thereby forming the void (A3). This takes place because of the property that the reinforcing fiber (A1), which is in the compressed state due to pressure, is raised up in the precursor (a) of the porous body (A) due to the elastic modulus thereof. The void (A3) is continuous at least in a thickness direction.

In the porous body (A) of the present invention, it is preferable that the content rate by volume (%) of the reinforcing fiber (A1) be in the range of 0.5 to 55% by volume, that the content rate by volume (%) of the resin (A2) be in the range of 2.5 to 85% by volume, and that the content rate by volume (%) of the void (A3) be in the range of 10 to 97% by volume.

When the content rate by volume of the reinforcing fiber (A1) in the porous body (A) is 0.5% or more by volume, the reinforcing effect derived from the reinforcing fiber (A1) can be made sufficient; and thus, this is preferable. On the other hand, when the content rate by volume of the reinforcing fiber (A1) is 55% or less by volume, the content rate by volume of the resin (A2) relative to the reinforcing fiber (A1) increases so that the reinforcing fibers (A1) in the porous body (A) are firmly bound with each other, resulting in the sufficient reinforcing effect of the reinforcing fiber (A1). Accordingly, the mechanical characteristics of the porous body (A), especially a bending characteristic thereof, can be satisfied; and thus, this is preferable.

When the content rate by volume of the resin (A2) is 2.5% or more by volume in the porous body (A), the reinforcing fibers (A1) in the porous body (A) can be firmly bound with each other so that the reinforcing effect of the reinforcing fiber (A1) can be made sufficient. Accordingly, the mechanical characteristics of the porous body (A), especially a bending characteristic thereof, can be satisfied; and thus, this is preferable. On the other hand, when the content rate by volume of the resin (A2) is 85% or less by volume, formation of void (A3) is not disturbed; and thus, this is preferable.

In the porous body (A), the reinforcing fiber (A1) is covered with the resin (A2), in which thickness of the covering resin (A2) (cover thickness) is preferably in the range of 1 μm or more and 15 μm or less. In view of shape stability of the porous body (A) and an easiness and a freedom in the thickness control, the covering state of the reinforcing fiber (A1) covered with the resin (A2) is satisfactory so far as the point at which the single fibers of the reinforcing fibers (A1) that constitute the porous body (A) are crossing with each other is covered therewith. A more preferable embodiment is the state that the resin (A2) covers around the reinforcing fiber (A1) with the above-mentioned thickness. In this state, the surface of the reinforcing fiber (A1) is not exposed because of the resin (A2). In other words, this means that the reinforcing fiber (A1) has a film formed with the resin (A2), similarly to an electric wire. Through this, the porous body (A) can have the further enhanced shape stability and ensures expression of the mechanical characteristics. With regard to the covering state of the reinforcing fiber (A1) covered with the resin (A2), the reinforcing fiber (A1) does not need to be entirely covered; and thus, the state is satisfactory so far as the shape stability, the flexural modulus, and the bending strength of the porous body (A) of the present invention are not impaired.

In the porous body (A), the content rate by volume of the void (A3) is preferably in the range of 10% by volume or more and 97% by volume or less. Because the content rate of the void (A3) is 10% or more by volume, density of the porous body (A) is low and the lightweightness thereof can be satisfied; and thus, this is preferable. On the other hand, when the content rate of the void (A3) is 97% or less by volume, this means that the thickness of the resin (A2) covering around the reinforcing fiber (A1) is sufficient, so that the reinforcing fibers (A1) in the porous body (A) can be sufficiently reinforced with each other thereby enhancing the mechanical characteristics; and thus, this is preferable. The upper limit value of the content rate by volume of the void (A3) is preferably 97% by volume. In the present invention, total of the content rates by volume of the reinforcing fiber (A1), the resin (A2), and the void (A3), these being the components that constitute the porous body (A), is taken as 100% by volume.

The density ρ of the porous body (A) is preferably 0.9 g/cm$^3$ or less. When the density ρ of the porous body (A) is 0.9 g/cm$^3$ or less, this means that the mass of the porous body (A) is lowered, thereby contributing to reduction in the mass of the product to be obtained; and thus, this is preferable. The density is more preferably 0.7 g/cm$^3$ or less, while still more preferably 0.5 g/cm$^3$ or less. Although there is no restriction as to the lower limit of the density, in the porous body (A) having the reinforcing fiber (A1) and the resin (A2), in general, the lower limit can be the value calculated from the volume ratios of the reinforcing fiber (A1), the resin (A2), and the void (A3), which are the constituting components thereof. In view of retaining the mechanical characteristics of the porous body (A), the density of the porous body (A) itself in the molded article of the present invention is preferably 0.03 g/cm$^3$ or more, although this value is different depending on the reinforcing fiber (A1) and the resin (A2) to be used.

The precursor (a) of the porous body (A) of the present invention expands with heating because the void increases. The porous body (A) is obtained by this expansion of the void. More specifically, the precursor (a) is the one before this expansion after formation of the thin film layer (B). The porous body after the process (I) and the process (II) of the present invention is not the precursor (a) of the present invention, but can be considered to be the porous body (A), even if after these processes the void is increased by heating under a prescribed condition to cause expansion. Here, although it does not matter whether the void is present in the stage of the precursor (a), in order to form a flat and smooth thin film layer (B) at the process (I) and in view of the surface character of the molded article to be obtained, the content rate by volume of the void included in the precursor (a) is preferably less than 10% by volume. The content rate is more preferably 5% or less by volume, while still more preferably 3% or less by volume.

In order to realize the expansion, it is preferable that the precursor (a) include the reinforcing fibers that are made into a compressed state by applying pressure and a blowing agent. In view of a higher freedom in the molding condition, it is more preferable that the precursor (a) include the reinforcing fibers that are made into a compressed state by applying pressure. The kind and shape of the reinforcing fiber are preferably those mentioned before. It is more preferable that the reinforcing fibers be in the state of a discontinuous and random dispersion, while still more preferably in the state of a monofilament-like and random dispersion. With regard to the blowing agent, there are a physical blowing agent that can be blown by a pressure release of a compressed gas, a physical change of a gas, or the like, and a chemical blowing agent that can generate a gas by a thermal decomposition or a chemical reaction. Of these, the chemical blowing agent that can generate a nitrogen gas or a carbon dioxide gas by a thermal decomposition is called a thermal decomposition type chemical blowing agent. The thermal decomposition type chemical blowing agent is a compound that is liquid or solid at a normal temperature and is decomposed or gasified upon heating. The thermal decomposition type chemical blowing agent is preferably a compound that does not substantially disturb the process to produce a precursor of a structural body to be used in the production method of the structural body of the present invention, and the decomposition temperature of the thermal decomposition type chemical blowing agent is preferably in the range of 180 to 250° C.

In the porous body (A), it is preferable that the void (A3) be formed by a restoring force generated as follows. Namely, the reinforcing fiber (A1) that is made into the compressed state by applying pressure is raised by lowering a viscosity of the resin (A2) in the precursor (a) of the porous body (A) thereby generating a restoring force to resume an original state (pre-compression shape). This is preferable because the reinforcing fibers (A1) are bound with each other via the resin (A2) thereby expressing a firmer compression characteristics and a shape retentive property of the porous body (A).

When the flexural modulus of the porous body (A) is expressed by Ep and the specific gravity of the porous body (A) is expressed by $\rho$, the specific flexural modulus of the porous body (A) expressed by $Ep^{1/3} \cdot \rho^{-1}$ is preferably 3 or more. When the specific flexural modulus of the porous body (A) is less than 3, even if the flexural modulus is high, the specific gravity is also high, so that an intended weight reduction effect as a molded article cannot be obtained; and thus, this is not preferable. In general, the specific flexural modulus of a steel material and aluminum is 1.5 or less; and thus, this range of the specific flexural modulus is extremely good as compared with these metal materials. The specific flexural modulus thereof is preferably 3 or more, i.e., higher than 2.3, which is a general specific flexural modulus of a molded article of the carbon fiber-reinforced resin composite material that is drawing an attention because of the weight reduction effect thereof. The specific flexural modulus is more preferably 5 or more. Although the upper limit of the specific flexural modulus is not particularly restricted, it is preferably 20 or less. When the specific flexural modulus of the porous body (A) is more than 20, this means a low flexural modulus even though the weight reduction effect is sufficient, so that an intended shape as a molded article is difficult to be retained and that the flexural modulus of the porous body itself is low; and thus, this is not preferable.

The flexural modulus Ep of the porous body (A) is preferably 3 GPa or more, while more preferably 6 GPa or more. When the flexural modulus Ep of the porous body (A) is less than 3 GPa, the range as a molded article is limited so that this is not preferable. In order to make design of the porous body (A) easy, it is preferable that the flexural modulus be isotropic.

In the porous body (A) of the present invention, the elasticity restoring force upon compression of 50% is preferably 1 MPa or more. Here, the elasticity restoring force is compression strength upon compression of 50% in a thickness direction of the porous body (A), measured in accordance with JIS K7220 (2006). When the elasticity restoring force upon compression of 50% in a thickness direction is 1 MPa or more, the molded article thereof is excellent in the shape retentive property; and thus, a handling property, for example, upon fitting as a product to other member is excellent. Moreover, practically, when this is used such that a load is applied in the thickness direction of a molded article, this can withstand a light load; and when a load greater than a certain value is applied, the shape thereof changes. Accordingly, when a molded article is used as a product, in view of protection of a worker at the time of a fitting work, this is preferable. Practically, although there is no problem when the elasticity restoring force upon compression of 50% is 1 MPa or more, it is preferably 3 MPa or more, while more preferably 5 MPa or more.

In the molded article of the present invention, the difference in the expansion rates of the porous body (A) in a thickness direction is preferably 300% or less. When the difference in the expansion rates of the porous body (A) in a thickness direction is 300% or less, a crack or a winkle of the thin film layer (B) formed on the surface of the porous body (A) can be prevented. When obtaining the difference in the expansion rates of the porous body (A), first the expansion rate S of the porous body (A) is obtained. First, the total thickness t1 of the precursor (a) after having the thin film layer (B) formed on the surface thereof at the process (I) to be mentioned later and of the thin film layer (B), and the thickness t2 of the molded article obtained at the process (II) (total thickness of the porous body (A) and of the thin film layer (B)) are measured. From the thicknesses thus measured and from the following equation, the largest expansion rate S was designated by the maximum expansion rate Smax, and the smallest expansion rate S was designated by the minimum expansion rate Smin.

Expansion Rate $S(\%)=(t2 \div t1) \times 100$

From these expansion rates and the following equation, the difference in the expansion rates was calculated.

Expansion Rate Difference=$S$max−$S$min

Thin Film Layer (B)

In the molded article of the present invention, the thin film layer (B) has at least one function selected from the functions as a primer layer, a coating film layer, and a waterproof layer. Here, the primer layer means a layer having a function to enhance an adhesive property with a paint to be formed thereafter. The coating film layer is a design layer that is an outer surface of the molded article as a final product. The waterproof layer is a layer having a function capable of preventing a liquid from transmitting; and thus, when the thin film layer is formed as an outer surface of the molded article as a final product, penetration of a liquid into the porous body (A) can be prevented; and when this is formed as an inner surface thereof, this can provide a role to store a liquid that is penetrated into the porous body (A) without letting it to transmit.

In the molded article of the present invention, it is preferable that the thin film layer (B) have an additive (B1) and a thermosetting resin (B2), or an additive (B1) and a thermoplastic resin (B3).

The additive (B1) is added with an aim to provide the molded article with designability including a color, a pearl-like feeling, and a metallic feeling.

Illustrative examples of the additive (B1) include a pigment and a glass bead. Specific examples thereof are: organic pigments such as an azo pigment and phthalocyanine blue; metal pigments formed of metal powders such as powders of aluminum and brass; and inorganic pigments such as chromium oxide and cobalt blue. Of these, in view of heat resistance, metal pigments and inorganic pigments are preferable. When the reinforcing fiber has a dark color such as colors of a carbon fiber and an aramid fiber, the pigment having two or more layers that have structures with different refractive indexes are preferably used. Illustrative examples thereof include natural mica, artificial mica, alumina flake, silica flake, and glass flake, all being covered with titanium oxide or iron oxide. The layer structure like this can develop a color by an optical phenomenon such as interference, diffraction, or scattering of light in a visible light region. Utilization of the optical phenomenon such as interference, diffraction, or scattering can develop a color by reflection of light having a specific wavelength; and thus, they are preferably used when the reinforcing fiber having a deep color is used.

In view of suppressing a mass increase in the thin film layer (B) and the molded article, it is preferable that the additive (B1) having a hollow structure be used. In particular, in view of a weight reduction, a hollow glass bead, a porous resin particle, and the like are preferable.

The additive (B1) may be of sphere-like, fiber-like, or flake-like. The maximum size of the additive (B1) is preferably 200 μm or less. Here, the maximum size of the additive (B1) is the largest diameter of the primary particles of the additive (B1) or the largest diameter of the secondary particles thereof when the additive (B1) undergoes agglomeration or the like. When the maximum size of the additive (B1) is 200 μm or less, the surface of the thin film layer (B) is flat and smooth so that designability thereof can be enhanced. The maximum size of the additive (B1) can be obtained by observing the additive (B1) by means of an electron microscope as follows. Namely, arbitrary 100 additives (B1) are randomly selected in the picture that is enlarged such that the size may be measured to the unit of at least 1 μm; and a maximum distance between arbitrarily selected two points on the outer circumference line of each additive (B1) is measured. The maximum size is the average value of these maximum lengths.

The maximum size of the additive (B1) is more preferably 150 μm, while still more preferably 100 μm. The lower limit of the maximum size of the additive (B1) is preferably 1 μm, and more preferably 5 μm, while still more preferably 10 μm.

In the thin film layer (B) of the present invention, the thermosetting resin (B2) includes the thermosetting resin (B2) and a curing agent (B2'). There is no particular restriction as to the thermosetting resin (B2). Any arbitrary thermosetting resin (B2) such as an epoxy resin, an unsaturated polyester, and a phenol resin may be used. The thermosetting resin (B2) may be used singly, or a mixture thereof may be used as appropriate. When the additive (B1) giving designability is used, an epoxy resin and an unsaturated polyester, these having a high transparency, are preferably used.

With regard to the curing agent (B2'), there are a compound undergoing a stoichiometric reaction, such as an aliphatic polyamine, an aromatic polyamine, a dicyan amide, a polycarboxylic acid, a polycarboxylic acid hydrazide, an acid anhydride, a polymercaptan, and a polyphenol; and a compound acting as a catalyst such as an imidazole, a Lewis acid complex, and an onium salt. When the compound undergoing a stoichiometric reaction is used, occasionally, a curing facilitator such as an imidazole, a Lewis acid complex, an onium salt, a urea derivative, or a phosphine is further blended. Of these curing agents (B2'), an organic nitrogen compound having, in the molecule thereof, a nitrogen-containing group such as an amino group, an amide group, an imidazole group, a urea group, or a hydrazide group, may be preferably used, because the molded articles to be obtained with them are excellent in heat resistance and mechanical characteristics. The curing agent may be used singly or as a combination of a plurality of these agents.

In the thin film layer (B) of the present invention, there is no particular restriction as to the thermoplastic resin (B3). Arbitrary thermoplastic resin (B3) such as an acrylic resin, a urethane resin, a polyamide resin, a polyimide resin, a vinyl chloride resin, or the like may be used. The thermoplastic resin (B3) may be used singly, or a mixture thereof may be used as appropriate. The thermosetting resin (B2) and the thermoplastic resin (B3) may be selected in the same way as the resin (A2) that constitutes the porous body (A).

When the thin film layer (B) uses a pigment as the additive (B1) and has the thermosetting resin (B2), the difference in refractive indexes between the pigment and the cured product of the thermosetting resin (B2) is preferably 0.1 or less. The smaller the difference in the refractive indexes is, the higher the transparency of the thin film layer (B) is, thereby leading to enhancement in expression of the coloring effect of the pigment.

The state of the material to form the thin film layer (B) can be classified into a solution type, a dispersion type, and a powder type. In the solution type, main elements constituting the thin film layer (B) are dissolved in a solvent. There are an organic solvent type, a water type, and the like. In the dispersion type, main elements constituting the thin film layer (B) are dispersed in a solvent so as to be in the state of an emulsion; thus, this is also called an emulsion type. The powder type does not use a solvent, whereby it is in the state of powder formed of a solid portion. In view of convenience of the work of the process (I), the solution type and the dispersion type are preferable; furthermore, in view of a working environment, the solvent is preferably water; and in view of the time necessary to form the thin film layer (B), the solvent is preferably an organic solvent.

Molded Article

In the molded article of the present invention, the thickness of the thin film layer (B) is preferably in the range of 10 μm or more and 500 μm or less. When the thickness is less than 10 μm, upon molding to the porous body (A) at the process (II), the situation may occur that the thin film layer (B) is difficult to retain its own shape. When the thickness is more than 500 μm, a flat and smooth surface or a highly designable surface can be formed; but mass of the molded article increases so that expression of the lightweightness of the molded article is difficult. The thickness of the thin film layer (B) is more preferably 400 μm or less, while still more preferably 300 μm or less. Here, when the thin film layer (B) is formed on both the surface of the porous body (A) and the other surface thereof, the thickness of the thin film layer (B) is the individual thickness of each of the thin film layers (B); and the thickness of the thin film layer (B) located in at least one outer layer of the porous body (A) is preferably within the above-mentioned range, while more preferably, thickness of each of the thin film layers (B) in both outer layers is within the above-mentioned range.

In the molded article of the present invention, the surface roughness Ra2 of the thin film layer (B) is preferably 100 μm or less. When the surface roughness Ra2 is 100 μm or less, the surface thereof is flat and smooth, so that the molded article having further enhanced designability can be obtained. In the case that the thin film layer (B) is a binder layer, in view of not only chemical bonding but also mechanical anchoring, the surface roughness Ra2 is preferably 30 μm or more. On the other hand, in the case of a coating film layer, in view of designability, the surface roughness Ra2 is preferably 50 or less.

In the molded article of the present invention, the density ρ is preferably 1.0 g/cm$^3$ or less. When the density ρ of the molded article is 1.0 g/cm$^3$ or less, the mass of the molded article decreases, namely, this contributes to reduction in the mass of the product to be obtained; and thus, this is preferable. The density is more preferably 0.8 g/cm$^3$ or less, while still more preferably 0.6 g/cm$^3$ or less. Although there is no restriction as to the lower limit of the density, in the molded article having the porous body (A), which includes the reinforcing fiber (A1) and the resin (A2), and the thin film layer (B), which includes the additive (B1) and the thermosetting resin (B2) or the thermoplastic resin (B3), in general, the lower limit can be the value calculated from the volume ratios of the reinforcing fiber (A1), the resin (A2), the void (A3), the additive (B1), the thermosetting resin (B2), and the thermoplastic resin (B3), which are the constituting components thereof. In the molded article of the present invention, in view of retaining the mechanical characteristics of the molded article, the density of the molded article is preferably 0.05 g/cm$^3$ or more, although this value is different depending on the reinforcing fiber (A1), the resin (A2), and so forth to be used.

Illustrative example of the method for producing the precursor (a) may be a method in which a reinforcing fiber mat is impregnated with a resin that is in a molten or a softened state under a pressed or an evacuated condition. Specifically, in view of easy production thereof, a preferable example thereof is a method in which a piled substance having the resin disposed on both sides of the reinforcing fiber mat in a thickness direction and/or on a center thereof is heated and pressed so as to impregnate in the molten state thereof.

The method may involve a process to previously expand the precursor (a) or a process to previously shape to an intended shape in accordance with an object of the molded article so far as these processes do not disturb formation of the thin film layer (B) at the process (I).

Preform of a Molded Article

The preform of a molded article according to the present invention is a preform of a molded article having a thin film layer (B) formed on a surface of a porous body (A) which includes a reinforcing fiber (A1), a resin (A2), and a void (A3), in which the preform is provided with a precursor (a) of the porous body (A) and the thin film layer (B) formed on a surface of the precursor (a), and in which an adhesion property of the thin film layer (B) to the precursor (a) belongs the classes 0 to 3 in accordance with JIS K5600-5-6 (1999).

When the preform like this is used, the thin film layer (B) is prevented from excessive penetration into the porous body (A), so that the weight-reduction in the molded article can be accomplished. In addition, when the precursor (a) is expanded thus molded to the porous body (A), delamination of the thin film layer (B) can be suppressed; and also, among others, the shape-formability and the followability to a mold are excellent. In addition, even in the case that the process (II), i.e., the molding process, is carried out in the place different from the process (I), in the preform of the molded article according to the present invention, there is no need, among others, to laminate the precursor (a) with the thin film layer (B) in the molding process because the precursor (a) of the porous body (A) is attached with the thin film layer (B) so as to adhere with an intended adhesion strength. Accordingly, a handling property thereof is so good that the molded article can be conveniently produced.

Method for Producing the Molded Article

In the method for producing the molded article of the present invention, first, the preform is obtained by forming the thin film layer (B) on the surface of the precursor (a) of the porous body (A) (process (I)). The precursor (a) may be produced by a method in which the resin (A2) that is in a molten state, or in a softened state, or in a flowable state is pressed or evacuated to a reinforcing fiber mat formed of the reinforcing fibers (A1). Specifically, in view of easy production thereof, a preferable example thereof is a method in which a piled substance having the resin (A2) disposed on both sides of the reinforcing fiber mat in a thickness direction and/or on a center thereof is heated and pressed thereby impregnating the molten resin (A2).

For example, the reinforcing fiber mat that constitutes the porous body (A) may be produced by a method in which the reinforcing fibers (A1) are previously dispersed into the state of a strand and/or in the substantially monofilament-like state to produce the reinforcing fiber mat. Heretofore known methods for producing the reinforcing fiber mat are: a dry process such as an air-laid method in which the reinforcing fibers (A1) are made into a dispersed sheet in an air stream and a carding method in which the reinforcing fibers (A1) are mechanically combed with shaping thereby forming a sheet, as well as a wet process with a Radright method in which the reinforcing fibers (A1) are stirred in water for papermaking. With regard to the method with which the reinforcing fiber (A1) approaches more to a monofilament-like state, illustrative examples of the dry process include a method in which a fiber-opening bar is installed, a method in which a fiber-opening bar is vibrated, a method in which clearance of the card is made fine, and a method in which rotation speed of the card is adjusted. Illustrative examples of the wet process include a method in which stirring conditions of the reinforcing fiber (A1) are controlled, a method in which concentration of the reinforcing fiber in the dispersion solution is diluted, a method in which viscosity of the dispersion solution is controlled, and a vortex at the time of transporting the dispersion solution is suppressed. In particular, it is preferable that the reinforcing fiber mat be produced with a wet process, in which the ratio of the reinforcing fiber (A1) in the reinforcing fiber mat can be readily controlled by increasing the concentration of the charged fiber, or by controlling flow rate (flow amount) of the dispersion solution and the speed of a mesh conveyer, or the like. For example, when the speed of the mesh conveyer is slowed relative to the flow rate of the dispersion solution, the fibers in the reinforcing fiber mat to be obtained are not readily orientated toward a pulling direction so that a bulky reinforcing fiber mat can be produced. The reinforcing fiber mat may be composed of the reinforcing fiber single body, or a mixture of the reinforcing fiber (A1) with a matrix resin component in the form of powder or fiber, or a mixture of the reinforcing fiber (A1) with an organic compound or an inorganic compound, or the reinforcing fibers (A1) may be filled among themselves with the resin component.

In order to realize the methods described above, a compression molding machine or double belt press equipment may be suitably used. A batch type method is carried out with the former equipment; in this method, the productivity thereof can be increased by employing an intermittent press system in which 2 or more pieces of equipment for heating and cooling are arranged in parallel. A continuous type method is carried out with the latter equipment, in which continuous processing can be readily carried out so that this method is superior in the continuous productivity.

At the process (I), the thin film layer (B) is formed on the surface of the precursor (a) that is formed as described above. There is no particular restriction as to the method for forming the thin film layer (B); it is sufficient so far as the thin film layer (B) in accordance with the object thereof is obtained. Illustrative examples thereof include: a dry coating method such as plating, wet coating using a solution or the like, and a method in which the thin film layer (B) is formed by modifying the surface of the precursor (a). Of these, it is preferable that the thin film layer (B) be formed by wet coating. Illustrative examples of the coating method include a brush coating method, a roller coating method, a spray coating method, an airless spray coating method, a roll coater coating method, a baking finish method, an impregnation coating method, an electrodeposition method, an electrostatic coating method, a powder coating method, and a UV-cure coating method. A baking finish method is preferably used in a high temperature processing.

In the method for producing the molded article of the present invention, after the thin film layer (B) is formed on the precursor (a), the precursor (a) is expanded and thus molded to the porous body (A). Therefore, even when a resin in a molten or a softened state, or a flowable resin, or especially even a low-viscous resin such as the one used in wet coating, is used, excessive penetration of the thin film layer (B) into the porous body (A) can be prevented; and thus, the molded article having the thin film layer (B) with the thickness of 500 µm or less can be readily obtained. Accordingly, with regard to the appearance and designability that are required for the molded article, it can be said that this is the production method having a high freedom in the choice of the coating method and the thin film layer as described above.

The thin film layer (B) formed on the surface of the precursor (a) at the process (I) belongs preferably to classes 0 to 3 in the adhesion property to the precursor (a) as measured in accordance with JIS K5600-5-6 (1999). When the thin film layer (B) has an intended adhesion property to the surface of the precursor (a), even in the case that the process (II) is carried out in the place different from the process (I), the thin film layer (B) can be prevented from delamination, so that the molded article having excellent designability can be obtained.

The surface roughness Ra1 of the thin film layer (B) formed on the surface of the precursor (a) at the process (I) is preferably 50 µm or less. When the surface roughness Ra1 of the thin film layer (B) after the process (I) is 50 µm or less, the surface roughness Ra2 of the thin film layer (B) after the molding process of the process (II) can be made within the intended range.

Next, with regard to the process at which the precursor (a) is expanded and molded to the porous body (A) (process II)), although there is no particular restriction, it is preferable that the precursor be molded to the porous body (A) by lowering the viscosity of the resin (A2) that constitutes the precursor (a) of the porous body (A). A preferable method for lowering the viscosity of the resin (A2) is to heat the precursor (a) of the porous body (A). There is no particular restriction as to the heating method. The heating may be carried out by contacting with a mold or a hot plate whose temperature is set at an intended temperature or by a non-contacting heating by means of a heater or the like. In the case that a thermoplastic resin is used as the resin (A2) that constitutes the porous body (A), heating may be carried out at the temperature of the melting point or the softening point thereof or higher; in the case that a thermosetting resin is used, heating is carried out at the temperature lower than the temperature at which a curing reaction thereof initiates.

Although there is no restriction as to the method for controlling the thickness of the porous body (A) and of the molded article so far as the precursor (a) to be heated can be controlled within a target thickness, preferable examples thereof in view of convenience in the production thereof include a method in which the thickness is restricted by using a metal plate or the like and a method in which the thickness is controlled by pressure applied to the precursor (a). A compression molding machine or a double belt press machine may be preferably used as the equipment for achieving these methods described above. A batch type method is carried out with the former equipment; in this type, the productivity thereof can be increased by employing an intermittent press system in which 2 or more pieces of equipment for heating and cooling are arranged in parallel. A continuous type method is carried out with the latter equipment, in which continuous processing can be readily carried out so that this method is superior in the continuous productivity.

In the method for producing the molded article in the present invention, it is preferable that the method further include a process (III) in which the shape of the porous body (A) is changed, simultaneously with the process (II) or after completion of the process (II). The process (III) may be carried out by applying pressure for shaping in the heated state of the porous body (A).

The molded article of the present invention produced in the way as described above can be used variously. Illustrative examples of the preferable use thereof include: parts for electric and electronic equipment [for example, housings for a personal computer, a display, OA equipment, a mobile phone, a personal digital assistant, PDA (a personal digital assistant such as an electronic diary), a video camera, optical equipment, audio equipment, an air conditioner, illuminating equipment, entertainment goods, toy goods, and other home electric products, a tray, a chassis, an interior component, a vibration board, a speaker corn, and the case thereof]; sound components [for example, a speaker corn]; outer plates or body parts [for example, various members, various frames, various hinges, various arms, various axles, various car bearings, and various beams], [a hood, a roof, a door, a fender, a trunk lid, a side panel, a rear end panel, a front body, an underbody, various pillars, various members, various frames, various beams, various supports, various rails, and various hinges]; outer parts [for example, a bumper, a bumper beam, a molding, an undercover, an engine cover, a straightening plate, a spoiler, a cowl louver, and an aero part]; interior parts [for example, an instrument panel, a seat frame, a door trim, a pillar trim, a handle, and various modules]; structural parts for automobiles and bicycles [for example, a motor part, a CNG tank, and a gasoline tank]; parts for automobiles and bicycles [for example, a battery tray, a head lamp support, a pedal housing, a protector, a lamp reflector, a lamp housing, a noise shield, and a spare tire cover]; construction materials [wall inner members such as a sound shielding wall and a sound protection wall]; and aircraft parts [for example, a landing gear pod, a winglet, a spoiler, an edge, a ladder, an elevator, a fairing, a rib, and a seat]. In view of mechanical characteristics and shaping properties, the molded product is preferably used for automobile interior and exterior armor, housings for electric and electronic equipment, bicycles, structural materials for sporting goods, interior materials for aircrafts, boxes for transportation, and construction materials.

EXAMPLES

Hereinafter, the present invention will be further described in detail by Examples.

(1) Content Rate by Volume Vf of the Reinforcing Fiber in the Porous Body (A) in the Molded Article Only a portion of the porous body (A) was cut out from the molded article as a specimen. After the mass Ws of the specimen was weighed, the specimen was heated in an air at 500° C. for 30 minutes to burn out the resin (A2) component; and then, the mass Wf of the remaining reinforcing fiber (A1) was measured, and the content rate by volume Vf was calculated by the following equation. Here, the densities of the reinforcing fiber (A1) and of the resin (A2) obtained by measurement with a liquid weighing method in accordance with JIS Z8807 (2012) were used.

$$Vf(\% \text{ by volume}) = (Wf/\rho f) / \{Wf/\rho f + (Ws - Wf)/\rho r\} \times 100$$

$\rho f$: Density of the reinforcing fiber (A1) (g/cm$^3$)
$\rho r$: Density of the resin (A2) (g/cm$^3$)

(2) Density $\rho$ of the Porous Body (A) in the Molded Article

Only a portion of the porous body (A) was cut out from the molded article as a specimen; and an apparent density of the porous body (A) was measured with referring to JIS K7222 (2005). The size of the specimen was 100 mm as a vertical side and 100 mm as a horizontal side. The vertical side, the horizontal side, and the thickness of the specimen were measured with a micrometer; and from the measured values, the volume V of the specimen was calculated. The mass M of the cut-out specimen was measured with an electronic balance. By substituting the obtained mass M and volume V in the following equation, the density $\rho$ of the porous body (A) was calculated.

$$\rho[g/cm^3] = M[g]/V[cm^3]$$

(3) Density $\rho m$ of the Molded Article

A portion including the porous body (A) and the thin film layer (B) was cut out from the molded article as a specimen, and an apparent density of the molded article was measured in the same way as (2) Density $\rho$ of the Porous Body (A) in the Molded Article; and then, the density $\rho m$ was calculated.

(4) Content Rates by Volume of the Voids (A3) in the Precursor (a) of the Porous Body (A) and in the Porous Body (A)

A specimen with a vertical side of 10 mm and a horizontal side of 10 mm was cut out from the porous body (A) or the precursor (a), and the section thereof was observed with a scanning electron microscope (SEM) (S-4800 Type: manufactured by Hitachi High-Technologies Corp.); and then, 10 portions from the surface of the specimen at regular intervals were photographed with a magnification of 1,000. In each of these pictures, the area Aa of the void (A3) in the picture was obtained; and then, the void rate was calculated by dividing the area Aa of the void (A3) with the total area in the picture. The content rate by volume of the void in the porous body (A) or in the precursor (a) was obtained as an arithmetic average value from the void rates of total 50 portions, obtained from 5 specimens and 10 portions in each specimen.

(5) Adhesion Property of the Thin Film Layer (B) to the Precursor (a) of the Porous Body (A)

The adhesion property of the thin film layer (B) was evaluated with General test methods for paints—Mechanical properties of coating films—Adhesion (Cross-cut method) in accordance with JIS K5600-5-6 (1999). The specimen was observed with a laser microscope (VK-9510: manufactured by Keyence Corp.) with a magnification of 400. The observed picture was developed on a general image analysis software; and by utilizing the program incorporated in the software, the delaminated area of the thin film layer (B) observed in the picture was obtained. The test results in Table 1 belonging to the classes 0 to 3 in accordance with JIS K5600-5-6 were judged good; and those belonging to the classes 4 to 5 were judged not good.

(6) Maximum Size of the Additive (B1) in the Thin Film Layer (B)

The shape of the additive (B1) was measured by using a laser microscope. Measurement of the maximum size of the additive (B1) can be assumed to be a measurement of the additive (B1) alone, a measurement in the flowable state as a mixture with the resin (A2), and a measurement in the non-flowable state (cured or solidified state) as a mixture with the resin (A2). In the cases of the additive (B1) alone and the flowable state, the measurement was carried out as they were. In the case of the non-flowable state, after having been embedded into an epoxy resin, the specimen embedded was polished, and then the section thereof was observed to measure the maximum size thereof.

(7) Thickness of the Thin Film Layer (B)

A specimen with a vertical side of 10 mm and a horizontal side of 10 mm was cut out from the molded article; and in the same way as (5) Adhesion Property of the Thin Film Layer (B) to the Precursor (a) of the Porous Body (A), the thickness of the thin film layer (B) was measured by using a laser microscope. At 10 positions at regular intervals from the edge in the direction perpendicular to the thickness direction of the specimen, the position of the side of the porous body (A) from the surface of the thin film layer (B) was measured. The thickness of the thin film layer (B) was obtained as an arithmetic average value from the thicknesses of total 50 position of the thin film layer (B), obtained from 5 specimens and 10 positions in each specimen.

(8) Surface Roughnesses Ra1 and Ra2 of the Thin Film Layer (B)

By using the surface roughness meter, for the thin film layer (B) formed at the process (I) and the thin film layer (B) in the molded article, the cut-off value and the standard length were selected in accordance JIS-B-0601 (2001), and the surface roughnesses Ra1 (μm) and Ra2 (μm) were obtained.

(9) Difference in the Expansion Rates of the Porous body (A) in the Thickness Direction After the thin film layer (B) is formed at the process (I), the total thickness t1 of the precursor (a) and the thin film layer (B) was measured, and then, the thickness t2 of the molded article molded at the process (II) (thickness of the porous body (A) and the thin film layer (B)) was measured. From the measured thicknesses and the following equation, the largest expansion rate S was designated as the maximum expansion rate Smax, and the least expansion rate S was designated as the minimum expansion rate Smin.

$$\text{Expansion Rate } S(\%) = (t2 \div t1) \times 100$$

From these expansion rates and the following equation, the difference in the expansion rates was calculated.

$$\text{Expansion Rate Difference} = Smax - Smin$$

(10) Air Permeability of the Porous Body (Air Permeability in the Thickness Direction)

The air permeability of the porous body (A) was measured in accordance with following (a) to (d). When air permeation was confirmed before 500 Pa, i.e., the upper limit in the test condition based on the JIS standard, this was judged to be "air permeable"; the other was judged to be "air non-permeable".

- (a) A specimen having the size of 100 mm×100 mm with the thickness of 5 mm is cut out from the porous body (A) (when the thickness is 5 mm or less, this is used as it is; when the thickness is more than 5 mm, the thickness thereof is adjusted by cutting process or the like).
- (b) Edges of the specimen (cut surfaces) are covered with 4-surface tape (to prevent air permeation to a direction perpendicular to the thickness direction).
- (c) The specimen is attached to one end of the cylinder of the test machine measurable with the JIS L1096 (2010) A method (Frazier method).
- (d) The aspiration fan and the air hole are adjusted such that the pressure with an inclined manometer may be 500 Pa or less.

(11) Bending Test

A specimen was cut out from the molded body, and the flexural modulus thereof was measured in accordance with the ISO 178 method (1993). The number of the measurement was n=5, and the arithmetic average value thereof was obtained as the flexural modulus Ec. The measurement instrument "Instron (registered trademark)" 5565 type universal material testing machine (manufactured by Instron Japan Co., Ltd.) was used. From the obtained result and the following equation, the specific flexural modulus of the molded body was calculated.

Specific Flexural modulus=$Ec^{1/3}/\rho$

In Examples and Comparative Examples described below, the following materials were used.

Reinforcing Fiber Mat 1

Figure 2:
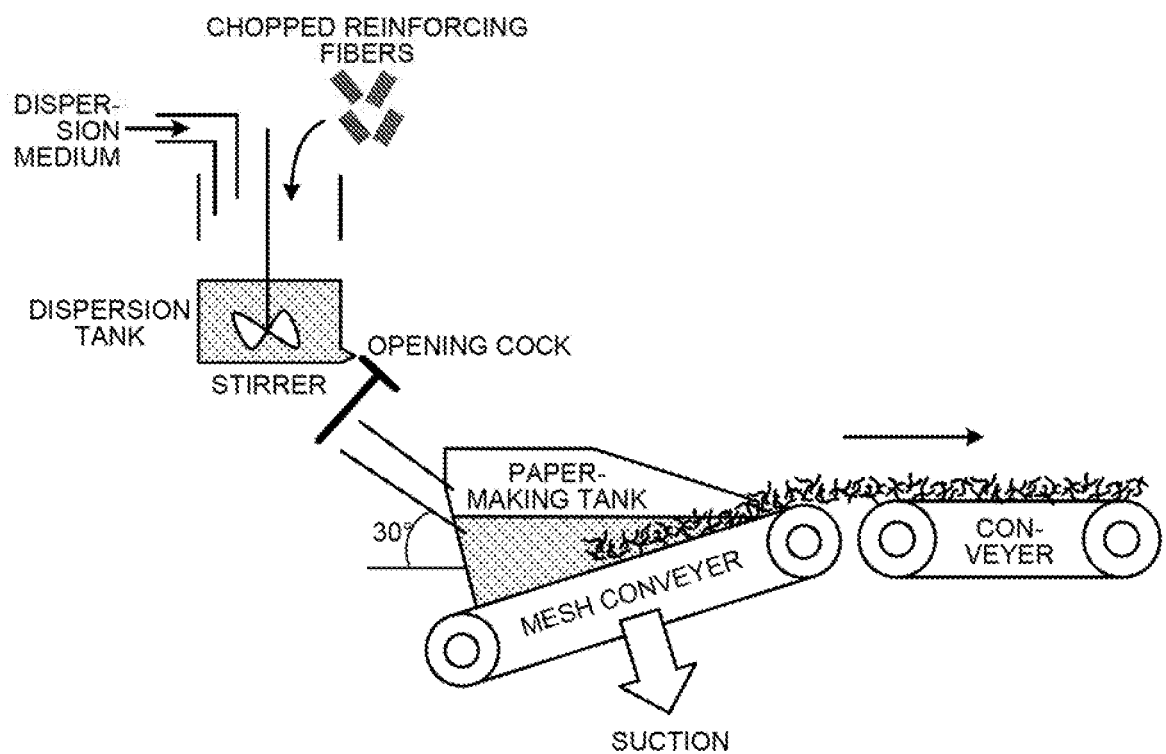
FIG. 2 is a schematic drawing depicting one example of production equipment of the reinforcing fiber mat according to the present invention.

Chopped carbon fibers were obtained by cutting "Torayca" T700S-12K (manufactured by Toray Industries, Inc.) to the length of 5 mm with a cartridge cutter. A dispersion solution with the concentration of 0.1% by mass including water and a surfactant (polyoxyethylene lauryl ether (trademark): manufactured by Nakarai Tesque, Inc.) was prepared; and by using this dispersion solution and the chopped carbon fiber, a reinforcing fiber mat was produced by using the production equipment of the reinforcing fiber mat as illustrated in FIG. 2. The production equipment illustrated in FIG. 2 is provided with, as a dispersion tank, a cylindrical vessel with a diameter of 1,000 mm having in the bottom thereof an opening cock and a linear transporting part (inclination angle of 30°) connecting between the dispersion tank and a papermaking tank. A stirrer is installed in the upper opening of the dispersion tank; the chopped carbon fibers and the dispersion solution (dispersion medium) can be charged from this opening. The papermaking tank is provided in the bottom thereof with a mesh conveyer having a papermaking surface having the width of 500 mm; and a conveyer that can transport the carbon fiber substrate (paper-made substrate) is connected to the mesh conveyer. The papermaking was carried out in the dispersion solution with the carbon fiber concentration of 0.05% by mass. The paper-made carbon fiber substrate was dried in a drying oven at 200° C. for 30 minutes to obtain the reinforcing fiber mat 1 with the basis weight of 100 g/m².

PP Resin

A resin sheet with the basis weight of 200 g/m², formed of 80% by mass of unmodified polypropylene resin ("Prime Polypro" (registered trademark) J105G: manufactured by Prime Polymer Co., Ltd.) and 20% by mass of acid-modified polypropylene resin ("ADMER" QB510: manufactured by Mitsui Chemicals, Inc.), was prepared.

Paint 1: As paint 1, "nax PP primer" (manufactured by Nippon Paint Co., Ltd.) was prepared. The paint 1 includes a thermoplastic resin, functioning as a primer layer.

Paint 2: As paint 2, "Creative Color Spray" (manufactured by Asahipen Corp.) was prepared. The paint 2 includes a thermoplastic resin, functioning as a coating film layer.

Paint 3: As paint 3, a mixture of 100 parts by mass of jER 828 (manufactured by Mitsubishi Chemical Corp.) as a main ingredient and 11 parts by mass of triethylene tetramine (manufactured by Tokyo Ohka Co., Ltd.) as a curing agent, was prepared. The paint 3 includes a thermosetting resin, functioning as a waterproof layer.

Additive 1: As Additive 1, Glass Bubbles K20 (manufactured by 3M Company: bulk density of 0.13 g/cm³ and median diameter of 60 μm) was prepared.

Precursor (a) of the Porous Body (A)

A piled substance was prepared in which the reinforcing mat 1 as the reinforcing fiber mat and the PP resin as the resin sheet were disposed in the order of [resin sheet/reinforcing fiber mat/resin sheet/reinforcing fiber mat/reinforcing fiber mat/resin sheet/reinforcing fiber mat/resin sheet]. Next, by way of the following processes (1) to (4), the precursor (a) of the porous body (A) was obtained.

Process (1): The piled substance was disposed in a cavity of a mold for press molding that was pre-heated at 200° C.; and then, the mold was closed.

Process (2): Next, a pressure of 3 MPa was applied, and kept for 180 seconds.

Process (3): After the process (2), the temperature of the cavity was lowered to 50° C. with the pressure kept.

Process (4): The mold was opened, and the precursor (a) was taken out.

Example 1

At the process (I), on the surface of the precursor (a) of the porous body (A), the paint 1 was applied by spraying three times; and then, dried for 30 minutes to form the thin film layer (B) formed of the paint 1 on the precursor (a), whereby a preform was obtained. The surface roughness Ra1 and the adhesion property of the thin film layer (B) of the preform thus obtained are listed in Table 1.

Next, the preform was subjected to the following processes (II-1) to (II-5) as the process (II) to obtain the molded article. The characteristics of the molded article obtained in Example 1 are listed in Table 1.

Process (II-1): The preform was disposed in a cavity of a mold for press molding that was pre-heated at 200° C.; and then, the mold was closed.

Process (II-2): After the preform was kept for 120 seconds, a pressure of 3 MPa was applied, and then kept for further 60 seconds.

Process (II-3): The cavity of the mold was opened, and then, a metal spacer was inserted in the edge thereof; and the clearance thereof was adjusted such that the thickness of the molded article to be obtained became 3.4 mm.

Process (II-4): The cavity of the mold was clamped, and the cavity temperature was cooled to 50° C. with the pressure kept.

Process (II-5): The molded article was taken out by opening the mold.

Example 2

The paint 2 was applied by spraying on the surface of the precursor (a) twice; and then dried for 1 hour to form the thin film layer (B) formed of the paint 2 on the precursor (a), whereby a preform was obtained. The surface roughness Ra1 and the adhesion property of the thin film layer (B) of the preform thus obtained are listed in Table 1.

Next, the preform thus obtained was subjected to the processes (II-1) to (II-5) in the same way as Example 1 to obtain the molded article. The characteristics of the molded article obtained in Example 2 are listed in Table 1.

Example 3

By using a roller, the paint 3 was applied once onto the surface of the precursor (a); and then dried in a drying oven with the furnace temperature of 50° C. for 1 hour to form the thin film layer (B) formed of the paint 3 on the precursor (a), whereby a preform was obtained. The surface roughness Ra1 and the adhesion property of the thin film layer (B) of the preform thus obtained are listed in Table 1.

Next, the preform thus obtained was subjected to the processes (II-1) to (II-5) in the same way as Example 1 to obtain the molded article. The characteristics of the molded article obtained in Example 3 are listed in Table 1.

Example 4

Paint 4 was prepared by adding 15 parts by weight of the additive 1 to the paint 3. In the same way as Example 3 except for the use of the paint 4, the thin film layer (B) formed of the paint 4 was formed on the precursor (a), whereby a molded article was obtained. The surface roughness Ra1 and the adhesion property of the thin film layer (B) thus obtained, as well as the characteristics of the molded article obtained in Example 4, are listed in Table 1.

Example 5

Figure 3:
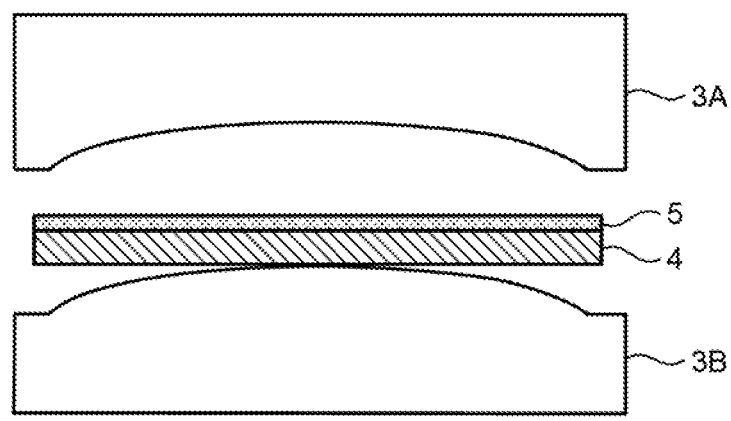
FIG. 3 is a drawing to describe production of the molded article according to the present invention.

The molded article was obtained in the same way as Example 1 except that the precursor (a) was disposed in the mold described in FIG. 3 to obtain the molded article. The surface roughness Ra1 and the adhesion property of the thin film layer (B) thus obtained, as well as the characteristics of the molded article obtained in Example 5, are listed in Table 1. In FIG. 3, the number 4 designates the precursor (a), the number 5 designates the thin film layer (B) formed of the paint 1, 3A designates the upper mold, and 3B designates the lower mold.

Example 6

Figure 4:
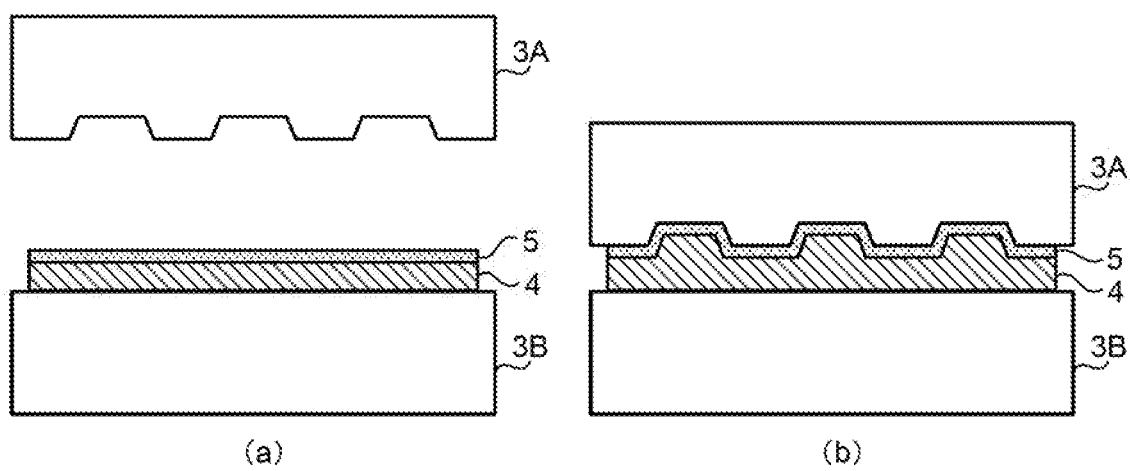
FIG. 4 is a drawing to describe production of the molded article according to the present invention.

The preform, used in Example 1, having the thin film (B) layer formed on the surface thereof and the mold (3A and 3B) having the concave-convex difference of 0.6 mm as illustrated in FIG. 4 were prepared. Then, the preform was subjected to the processes (II-6) to (II-10) described below as the process (II) to obtain the molded article. The characteristics of the molded article obtained in Example 6 are listed in Table 1.

Process (II-6): The preform was disposed in the IR heater whose temperature was set at 250° C.

Process (II-7): After the preform was heated for 60 seconds, the preform heated was disposed in the mold whose temperature was set at 120° C., which was then followed by pressing with the pressure of 3 MPa; and then kept for further 5 seconds.

Process (II-8): The mold cavity was opened; and after a metal spacer was inserted in the edge thereof, the mold was adjusted such that the thickness of the concavity portion in the molded article became 3.4 mm.

Process (II-9): The mold cavity was clamped; and this pressurized state was kept for 180 seconds.

Process (II-10): The mold was opened; and then, the molded article was taken out.

Example 7

The molded article was obtained in the same way as Example 6 except that the mold having the concave-convex difference of 3.6 mm as illustrated in FIG. 4 was prepared. The characteristics of the molded article obtained in Example 7 are listed in Table 1.

Example 8

The molded article was obtained in the same way as Example 1 except that after a fluorine type releasing agent was applied on the surface of the precursor (a) of the porous body (A), the paint 1 was applied thereon. The surface roughness Ra1 and the adhesion property of the thin film layer (B) thus obtained, as well as the characteristics of the molded article obtained in Example 8 are listed in Table 1.

Example 9

The same materials as those of Example are used. The molded article was obtained in the same way as Example 1 except that the clearance of the mold cavity was adjusted such that the thickness of (a) of the precursor at the process (3) to obtain the precursor (a) of the porous body (A) might become 1.24 mm. The characteristics of the molded article obtained in Example 9 are listed in Table 1.

Comparative Example 1

The porous body (A) was obtained in the same way as Example 1 except that the thin film layer (B) was not formed on the surface of the precursor (a). Onto the porous body (A) thus obtained, the thin film layer (B) formed of the paint 1 was formed in the same way as Example 1 to obtain the molded article. The surface roughness Ra1 and the adhesion property of the thin film layer (B) thus obtained, as well as the characteristics of the molded article obtained in Comparative Example 1 are listed in Table 2.

Comparative Example 2

The molded body not including the void was obtained by carrying out the processes (II-1) to (II-5) in the same way as Example 1 except that 3 sheets of the precursor (a) of the porous body (A) were piled up and that the holding period of the process (II) was 600 seconds. Onto the molded body thus obtained, the thin film layer (B) formed of the paint 1 was formed in the same way as Example 1 to obtain the molded article. The surface roughness Ra1 and the adhesion property of the thin film layer (B) thus obtained, as well as the characteristics of the molded article obtained in Comparative Example 2 are listed in Table 2.

TABLE 1

|  |  | Example 1 | Example 2 | Example 3 | Example 4 | Example 5 | Example 6 | Example 7 | Example 8 | Example 9 |
|---|---|---|---|---|---|---|---|---|---|---|
| Precursor (a) of porous body (A) Fiber substrate |  |  |  |  |  |  |  |  |  |  |
| Reinforcing fiber (A1) | — | Carbon fiber | Carbon fiber | Carbon fiber | Carbon fiber | Carbon fiber | Carbon fiber | Carbon fiber | Carbon fiber | Carbon fiber |
| Fiber length | mm | 5 | 5 | 5 | 5 | 5 | 5 | 5 | 5 | 5 |
| Substrate preparation | Method | Wet method | Wet method | Wet method | Wet method | Wet method | Wet method | Wet method | Wet method | Wet method |
| Basis weight | g/m² | 100 | 100 | 100 | 100 | 100 | 100 | 100 | 100 | 100 |
| Fiber opening | State | Monofillament | Monofillament | Monofillament | Monofillament | Monofillament | Monofillament | Monofillament | Monofillament | Monofillament |
| Fiber dispersion | State | Random | Random | Random | Random | Random | Random | Random | Random | Random |
| Resin substrate |  |  |  |  |  |  |  |  |  |  |
| Resin (A2) | — | PP | PP | PP | PP | PP | PP | PP | PP | PP |
| Basis weight | g/m² | 200 | 200 | 200 | 200 | 200 | 200 | 200 | 200 | 200 |
| Thickness | mm | 1.12 | 1.12 | 1.12 | 1.12 | 1.12 | 1.12 | 1.12 | 1.12 | 1.24 |
| Void rate | % by volume | 0.2 | 0.2 | 0.2 | 0.2 | 0.2 | 0.2 | 0.2 | 0.2 | 9.5 |
| Thin film layer (B) |  |  |  |  |  |  |  |  |  |  |
| Paint | — | Paint 1 | Paint 2 | Paint 3 | Paint 4 | Paint 1 | Paint 1 | Paint 1 | Paint 1 | Paint 1 |
| Additive (B1) | — | — | Pigment | — | Glass beads | — | — | — | — | — |
| Maximum size of additive (B1) | μm | — | 0.5 | — | 60 | — | — | — | — | — |
| Resin (B2) or (B3) | — | Thermoplastic | Thermoplastic | Thermosetting | Thermosetting | Thermoplastic | Thermoplastic | Thermoplastic | Thermoplastic | Thermoplastic |
| Process (I) | — | Wet coating | Wet coating | Wet coating | Wet coating | Wet coating | Wet coating | Wet coating | Wet coating | Wet coating |
| Thickness | μm | 15 | 20 | 100 | 100 | 15 | 15 | 15 | 15 | 20 |
| Surface roughness: Ra1 | μm | 10 | 10 | 10 | 40 | 10 | 10 | 10 | 10 | 30 |
| Adhesion property | Class | 0 | 0 | 1 | 1 | 0 | 0 | 0 | 4 | 4 |
| Molded article |  |  |  |  |  |  |  |  |  |  |
| Process (II) | — | Heating/fiber restoring force | Heating/fiber restoring force | Heating/fiber restoring force | Heating/fiber restoring force | Heating/fiber restoring force | Heating/fiber restoring force | Heating/fiber restoring force | Heating/fiber restoring force | Heating/fiber restoring force |
| Surface roughness: Ra2 | μm | 20 | 20 | 15 | 45 | 20 | 25 | 95 | 20 | 35 |
| Process (III) | State | — | — | — | — | Bending shape | Concave-convex shape | Concave-convex shape | — | — |
| Difference in expansion rates | % | 0 | 0 | 0 | 0 | 0 | 55 | 320 | 0 | 0 |
| Content rate of reinforcing fiber (A1) in porous body (A) | % by volume | 6.7 | 6.7 | 6.7 | 6.7 | 6.7 | 6.7/5.6 | 6.7/3.2 | 6.7 | 6.7 |
| Content rate of resin (A2) in porous body (A) | % by volume | 26.6 | 26.6 | 26.6 | 26.6 | 26.6 | 26.6/22.4 | 26.6/12.8 | 26.6 | 26.6 |
| Content rate of void (A3) in porous body (A) | % by volume | 66.7 | 66.7 | 66.7 | 66.7 | 66.7 | 66.7/70.0 | 66.7/75 | 66.7 | 66.7 |
| Density of porous body (A) | g/cm³ | 0.36 | 0.36 | 0.36 | 0.36 | 0.36 | 0.36/0.30 | 0.36/0.18 | 0.36 | 0.36 |
| Flexural modulus of porous body (A): Ep | GPa | 8.1 | 8.1 | 8.1 | 8.1 | 8.1 | 8.1/7.1 | 8.1/3.8 | 8.1 | 8.1 |
| Specific flexural modulus of porous body (A) | — | 5.6 | 5.6 | 5.6 | 5.6 | 5.6 | 5.6/6.4 | 5.6/8.7 | 5.6 | 5.6 |
| Density of molded article | g/cm³ | 0.36 | 0.36 | 0.38 | 0.37 | 0.37 | 0.34 | 0.28 | 0.36 | 0.37 |
| Shape of void (A3) in porous body (A) | — | Continuous | Continuous | Continuous | Continuous | Continuous | Continuous | Continuous | Continuous | Continuous |

TABLE 2

| | | Comparative Example 1 | Comparative Example 2 |
|---|---|---|---|
| Precursor (a) of porous body (A) | | | |
| Fiber substrate | | | |
|   Reinforcing fiber (A1) | — | Carbon fiber | Carbon fiber |
|   Fiber length | mm | 5 | 5 |
|   Substrate preparation | Method | Wet method | Wet method |
|   Basis weight | g/m² | 100 | 100 |
|   Fiber opening | State | Monofilament | Monofilament |
|   Fiber dispersion | State | Random | Random |
| Resin substrate | | | |
|   Resin (A2) | — | PP | PP |
|   Basis weight | g/m² | 200 | 200 |
|   Thickness | mm | 1.12 | 3.36 |
|   Void rate | % by volume | 66.7 | 0.2 |
| Thin film layer (B) | | | |
| Paint | — | Paint 1 | Paint 1 |
|   Additive (B1) | — | — | — |
|   Maximum size of additive (B1) | μm | — | — |
|   Resin (B2) or (B3) | — | Thermoplastic | Thermoplastic |
| Process (I) | — | Wet coating | Wet coating |
| Thickness | μm | 800 | 15 |
| Surface roughness: Ra1 | μm | 250 | 7 |
| Adhesion property | Class | — | 0 |
| Molded article | | | |
| Process (II) | — | — | — |
| Surface roughness: Ra2 | μm | 230 | (15) |
| Process (III) | State | — | — |
| Difference in expansion rates | % | 0 | 0 |
| Content rate of reinforcing fiber (A1) in porous body (A) | % by volume | 6.7 | 20.0 |
| Content rate of resin (A2) in porous body (A) | % by volume | 26.6 | 80.0 |
| Content rate of void (A3) in porous body (A) | % by volume | 66.7 | 0.0 |
| Density of porous body (A) | g/cm³ | 0.36 | 1.08 |
| Flexural modulus of porous body (A): Ep | GPa | 8.1 | 14.0 |
| Specific flexural modulus of porous body (A) | — | 5.6 | 2.2 |
| Density of molded article | g/cm³ | 0.51 | 0.51 |
| Shape of void (A3) in porous body (A) | — | Continuous | Continuous |

Discussion

In Examples 1 to 5, after the thin film layer (B) was previously formed on the precursor (a) of the porous body (A), the thin film layer (B) was expanded to the porous body (A); thus, the molded article having a flat and smooth surface and an excellent lightweightness without an excessive penetration of the paint could be readily obtained. In Example 1, because the thin film layer (B) has a binding property, the adhesion property thereof to a designing paint to be applied thereafter is excellent. In Example 2, because the thin film layer (B) forms the coating film layer that will become a design surface of a final product, the molded article thereby obtained can be immediately treated as the product; and thus, a general coating process could be omitted. In Example 3, because the paint 3 formed of the thermosetting resin (B2) was used as the thin film layer (B), the molded article retaining a high surface flatness and smoothness even after expansion could be obtained. In Example 4, because the hollow glass beads were used as the additive (B1) in the paint 4, the molded article having enhanced lightweightness as compared with the one using a general additive (B1) could be obtained. Examples 5 to 7 have demonstrated that the present invention can also be applied to formation of a three-dimensional shape required to the molded article. In Example 7, the molded article having a larger maximum thickness (larger difference in the expansion rates) than the molded article obtained in Example 6 was obtained; thus, it is apparent that because of the thickness effect, the molded article expresses a high rigidity as a construction material. In addition, because the molded article having a shape with a large concave-convex difference (large difference in the expansion rates) could be obtained, a high degree of freedom in the molded shape was indicated. On the other hand, because the difference in the expansion rates was more than the preferable value, the thickness of the thin film layer (B) fluctuated partially in the convex portion of the molded article. In Example 8, impregnation of the thin film layer (B) could be suppressed; but because the adhesion between the precursor (a) of the porous body (A) and the thin film layer (B) was poor, the porous body (A) and the thin film layer (B) separated partially. Example 9 provides a simulation in which the precursor of the porous body (A) having the voids insufficiently impregnated with the resin (A2) was used; when the void rate of the precursor (a) was 10% or less, the molded article that was flat and smooth as well as excellent in the lightweightness without an excessive penetration of the paint could be obtained. On the other hand, in Comparative Example 1, because the paint 1 was applied on the porous body (A), it caused penetration of the paint to inside the molded article (porous body); and thus, it was difficult to form a flat and smooth coating film. It is clear that when the thin film layer (B) the same as that of Example 1 is intended to form, application of multiple coatings is necessary, resulting in increase in the coating process as well as the weight thereof. In Comparative Example 2, because coating application was carried out on the molded body not having the void, a flat and smooth coating film could be formed; but the lightweightness as the molded article was insufficient.

INDUSTRIAL APPLICABILITY

According to the present invention, a molded article having excellent rigidity and lightweightness, and also having designability and waterproof property can be produced with a convenient process.

REFERENCE SIGNS LIST

1 Reinforcing fiber
1a to 1f Monofilament
2 Two-dimensional orientation angle
3 Mold
3A Upper mold
3B Lower mold
4 Precursor (a)
5 Thin film layer (B)

The invention claimed is:
1. A method for producing a molded article having a thin film layer (B) formed on a surface of a porous body (A), the method comprising a process (I) and a process (II) described below in this order:
process (I): forming the thin film layer (B) on a surface of a precursor (a) of the porous body (A) to obtain a preform, and process (II): expanding and molding the precursor (a) to the porous body (A)

wherein in the preform obtained in the process (I), an adhesion property of the thin film (B) to the precursor (a) belongs to classes 0 to 3 in accordance with JIS K5600-5-6 (1999), wherein in the process (I), the thin film layer (B) is formed on the surface of the precursor (a) by wet coating, and wherein a content rate by volume of a void included in the precursor (a) is 10% or less by volume.

2. The method for producing a molded article according to claim 1, wherein the thin film layer (B) is at least one of a primer layer, a coating film layer, and a waterproof layer.

3. The method for producing a molded article according to claim 1, wherein the thin film layer (B) comprises an additive (B1) and a thermosetting resin (B2).

4. The method for producing a molded article according to claim 1, wherein the thin film layer (B) comprises an additive (B1) and a thermoplastic resin (B3).

5. The method for producing a molded article according to claim 3, wherein a maximum size of the additive (B1) is 200 μm or less.

6. The method for producing a molded article according to claim 1, wherein a thickness of the thin film layer (B) is in a range of 10 to 500 μm.

7. The method for producing a molded article according to claim 1, wherein a surface roughness Ra1 of the thin film layer (B) formed at the process (I) is 50 μm or less.

8. The method for producing a molded article according to claim 1, wherein a surface roughness Ra2 of the thin film layer (B) after the process (II) is 100 μm or less.

9. The method for producing a molded article according to claim 1, further comprising a process (III): changing a shape of the porous body (A) at the same time with the process (II) or after completion of the process (II).

10. The method for producing a molded article according to claim 1, wherein a difference in expansion rates in a thickness direction of the porous body (A) is 300% or less.

11. The method for producing a molded article according to claim 1, wherein the porous body (A) comprises a reinforcing fiber (A1), a resin (A2), and a void (A3).

12. The method for producing a molded article according to claim 1, wherein the porous body (A) has a void (A3) that is continuous in a thickness direction of the porous body (A).

13. The method for producing a molded article according to claim 11, wherein the porous body (A) expands by a restoring force of the reinforcing fiber (A1) at the process (II).

* * * * *